United States Patent
Wolf et al.

(10) Patent No.: US 9,836,509 B2
(45) Date of Patent: *Dec. 5, 2017

(54) GENERIC QUERY TEMPLATES FOR COMPLEX EVENT PROCESSING AND DATA STREAM SYSTEMS

(71) Applicant: SAP SE, Walldorf (DE)

(72) Inventors: Bernhard Wolf, Dresden (DE); Rahim Makhani, Dresden (DE)

(73) Assignee: SAP SE, Walldorf (DE)

( * ) Notice: Subject to any disclaimer, the term of this patent is extended or adjusted under 35 U.S.C. 154(b) by 244 days.

This patent is subject to a terminal disclaimer.

(21) Appl. No.: 14/292,818

(22) Filed: May 30, 2014

(65) Prior Publication Data
US 2014/0351287 A1    Nov. 27, 2014

Related U.S. Application Data

(63) Continuation-in-part of application No. 13/623,682, filed on Sep. 20, 2012.

(51) Int. Cl.
*G06F 17/30* (2006.01)

(52) U.S. Cl.
CPC .. *G06F 17/30516* (2013.01); *G06F 17/30424* (2013.01)

(58) Field of Classification Search
CPC .............. G06F 17/30398; G06F 17/30306
USPC .............. 707/779, 536, 797, 769, 600, 754; 715/536, 234
See application file for complete search history.

(56) References Cited

U.S. PATENT DOCUMENTS

| | | | |
|---|---|---|---|
| 5,664,173 A | 9/1997 | Fast | |
| 6,526,426 B1 * | 2/2003 | Lakritz | G06F 17/2258 704/8 |
| 6,944,817 B1 * | 9/2005 | Danneels | G06F 17/30867 707/999.001 |
| 6,981,207 B1 * | 12/2005 | Bakman | G06F 17/243 714/E11.188 |
| 8,145,681 B2 | 3/2012 | Macaleer et al. | |
| 8,200,684 B2 | 6/2012 | Seitz et al. | |
| 8,307,334 B2 | 11/2012 | Peterson | |
| 8,326,795 B2 | 12/2012 | Markovic | |
| 8,572,108 B2 | 10/2013 | Wong | |
| 8,713,049 B2 | 4/2014 | Jain et al. | |

(Continued)

*Primary Examiner* — Jeffrey A Burke
*Assistant Examiner* — Thong Vu
(74) *Attorney, Agent, or Firm* — Jones Day

(57) ABSTRACT

Systems and methods provide for queries with an arbitrary number of input streams to be created from a generic query template, during runtime, based on, for example, configuration parameters provided by the system or a user. The generic query templates include a generic query template string, query template segments, and an orchestration mechanism for automatic query template generation. The systems and methods of the present invention provide for the substitution of concrete input streams, counters (e.g., stream indices) and query template segments (which can include further placeholders) into the generic query templates. Further, the input placeholders of the generic query template provide for any part of the query template to be substituted with arbitrary logic. Also, the orchestration process is query language independent and can be applied (and extended) for any query language.

20 Claims, 14 Drawing Sheets

(56) References Cited

U.S. PATENT DOCUMENTS

| | | | |
|---|---|---|---|
| 9,122,669 B2* | 9/2015 | Demant | G06F 17/248 |
| 2004/0230594 A1* | 11/2004 | Flam | G06Q 10/10 |
| 2005/0050015 A1* | 3/2005 | Becker | G06F 17/30554 |
| 2005/0091199 A1* | 4/2005 | Focazio | G06F 17/30595 |
| 2005/0216451 A1* | 9/2005 | Enzler | G06F 17/30427 |
| 2006/0200766 A1* | 9/2006 | Lakritz | G06F 17/289 |
| | | | 715/234 |
| 2006/0206789 A1* | 9/2006 | Bakman | G06F 8/73 |
| | | | 715/234 |
| 2007/0073697 A1* | 3/2007 | Woods | G06F 17/30887 |
| 2007/0078988 A1* | 4/2007 | Miloushev | G06F 9/485 |
| | | | 709/227 |
| 2008/0189289 A1* | 8/2008 | Dettinger | G06F 17/30604 |
| 2008/0301124 A1 | 12/2008 | Alves et al. | |
| 2008/0301135 A1 | 12/2008 | Alves et al. | |
| 2009/0019020 A1 | 1/2009 | Dhillon et al. | |
| 2009/0083226 A1 | 3/2009 | Kawale et al. | |
| 2011/0093490 A1* | 4/2011 | Schindlauer | G06F 17/30477 |
| | | | 707/769 |
| 2011/0191383 A1* | 8/2011 | Addala | G06F 17/30 |
| | | | 707/797 |
| 2011/0295873 A1* | 12/2011 | Potter | G06F 19/321 |
| | | | 707/769 |
| 2012/0072455 A1* | 3/2012 | Jain | G06F 17/30427 |
| | | | 707/779 |
| 2012/0124063 A1* | 5/2012 | Wong | G06F 17/30427 |
| | | | 707/754 |
| 2012/0143895 A1* | 6/2012 | Salvetti | G06F 17/30654 |
| | | | 707/769 |
| 2012/0185425 A1* | 7/2012 | Reeves | G06F 17/30592 |
| | | | 707/600 |
| 2012/0290620 A1 | 11/2012 | Guan et al. | |
| 2013/0262501 A1* | 10/2013 | Kuchmann-Beauger | G06F 17/30451 |
| | | | 707/769 |
| 2013/0346390 A1 | 12/2013 | Jerzak et al. | |
| 2014/0082013 A1 | 3/2014 | Wolf et al. | |
| 2014/0095543 A1* | 4/2014 | Hsiao | G06F 17/30442 |
| | | | 707/779 |

* cited by examiner

FIG. 7A

```
 Generic query template in LINQ for an arbitrary number of input streams
 from e in (
    #in:input stream#       //Replace with QT segment specified in
                            //QTC configuration for the first input stream.
    <#in:stream addition#>  //Replace with 'Stream addition' QT segment
                            //for every additional input stream.
 )
 group e by new e.StreamId, e.Value into groups
 ...
```

Stream addition

.Union
(#in:input stream#)
<#in:stream addition#>

722

Input stream (#in:Stream#)

721

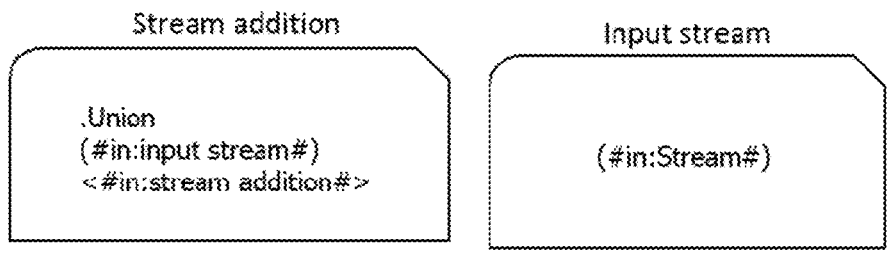

```
   -- Generic query template in CCL for an arbitrary number of input streams --
1  ...
2  SELECT
3    (
4    <#in:dict store#>
5    ;
6    <#in:dict aggregation#>
7    ) Value
8    ,#out:Stream# StreamId
9    ,coalesce(
10   <#in:EventType#>
11   ) EventType
12   ,sysdate() Time
13 FROM
14   #in:Stream#
15   <#in:stream addition#>
16 ;
```

Dictionary store  822 dict[#in:input stream index#]:=
CASE WHEN  #in:Stream#.Value IS NULL THEN
dict[#in:input stream index#] ELSE #in:Stream#.Value END
<#in:semicolon#>
<#in:dict store#>

Dictionary aggregation dict[#in:input stream index#]
<#in:summation#>
<#in:dict aggregation#>

Stream addition  825

FULL JOIN
in:Stream#
ON #in:Stream1#.EventType = #in:Stream#.EventType
AND #in:Stream1#.StreamId = #in:Stream#.StreamId
<#in:stream addition#>

Event type in:Stream#.EventType
<#in:comma#>
<#in:EventType#>

Summation

+

823

Comma

,

826

Semicolon

```
      ----- CCL generic query template after processing the first input stream -----
  1   ...
  2   SELECT
  3     (
  4     dict[1]:= CASE WHEN  #in:Stream1#.Value IS NULL THEN
  5       dict[1] ELSE #in:Stream1#.Value END
  6       <#in:semicolon#>
  7       <#in:dict store#>
  8     ;
  9     dict[1]
 10     <#in:summation#>
 11     <#in:dict aggregation#>
 12     ) Value
 13     ,#out:Stream# StreamId
 14     ,coalesce(
 15     #in:Stream1#.EventType
 16       <#in:comma#>
 17       <#in:EventType#>
 18     ) EventType
 19     ,sysdate() Time
 20   FROM
 21     #in:Stream1#
 22   FULL JOIN
 23     #in:Stream#
 24   ON #in:Stream1#.EventType = #in:Stream#.EventType
 25   AND #in:Stream1#.StreamId = #in:Stream#.StreamId
 26   <#in:Stream addition#>
 27   ;
```

```
                                      900a                       904a  908a           910a
        /*@SIMPLEQUERY=AGGREGATE*/
902a    CREATE OUTPUT WINDOW #out:EnergyConsumption_Stream#
906a    PRIMARY KEY DEDUCED KEEP #par : windowSize# #par:windowSizeUnit#
912a    AS SELECT sum (inStream.Power) Enc, inStream.ID ID
        FROM #in:Power_Stream# As inStream
914a    GROUP BY inStream.ID;
                                        916a
   918a
```

FIG. 9B

```
                                   900b                  904b  908b    910b
        /*@SIMPLEQUERY=AGGREGATE*/
902b    CREATE OUTPUT WINDOW EnergyConsumption_Machine1
906b    PRIMARY KEY DEDUCED KEEP 1 DAY
912b    AS SELECT sum (inStream.Power) Enc, inStream.ID ID
        FROM Power_Machine1 AS inStream
914b    GROUP BY inStream.ID;
                                      916b
   918b
```

GENERIC QUERY TEMPLATES FOR COMPLEX EVENT PROCESSING AND DATA STREAM SYSTEMS

RELATED APPLICATIONS

This application is a continuation-in-part of U.S. application Ser. No. 13/623,682, filed on Sep. 20, 2012, to which priority is claimed and which is incorporated herein by reference in its entirety.

FIELD

The present disclosure relates generally to the creation and deployment of data stream or complex event processing queries from generic query templates.

BRIEF DESCRIPTION OF THE DRAWINGS

The accompanying drawings illustrate the various embodiments and, together with the description, further serve to explain the principles of the embodiments and to enable one skilled in the pertinent art to make and use the embodiments.

FIG. 7A illustrates a generic query template in LINQ for an arbitrary number of input streams.

FIG. 7B illustrates possible query template segments for LINQ.

FIG. 7D illustrates an example of generating a specific query template with two input streams from a generic query template.

FIG. 8A illustrates a generic query template in CCL for an arbitrary number of input streams.

FIG. 8B illustrates possible query template segments for CCL.

FIG. 8D illustrates an example of a CCL generic query template after the integration of the first input stream.

FIG. 9A illustrates an example of a specific query template.

FIG. 9B illustrates an example of an instantiation of the specific query template of FIG. 9A.

DETAILED DESCRIPTION

According to an embodiment of the present disclosure, systems, methods, and non-transitory computer-readable mediums having program instructions thereon, provide for queries with an arbitrary number of input streams to be created from one generic query template, during runtime, based on configuration parameters provided by the user. These generic query templates include a generic query template string, query template segments, and an orchestration mechanism for automatic query template generation. Embodiments of the present invention support the substitution of concrete input streams and of counters (e.g., stream indices) or query template segments (that can include further placeholders). The input placeholder provides additional flexibility to the query template since now any part of a query template can be substituted with arbitrary logic. The orchestration process is query language independent and can be applied and extended for any query language.

Figure 1:
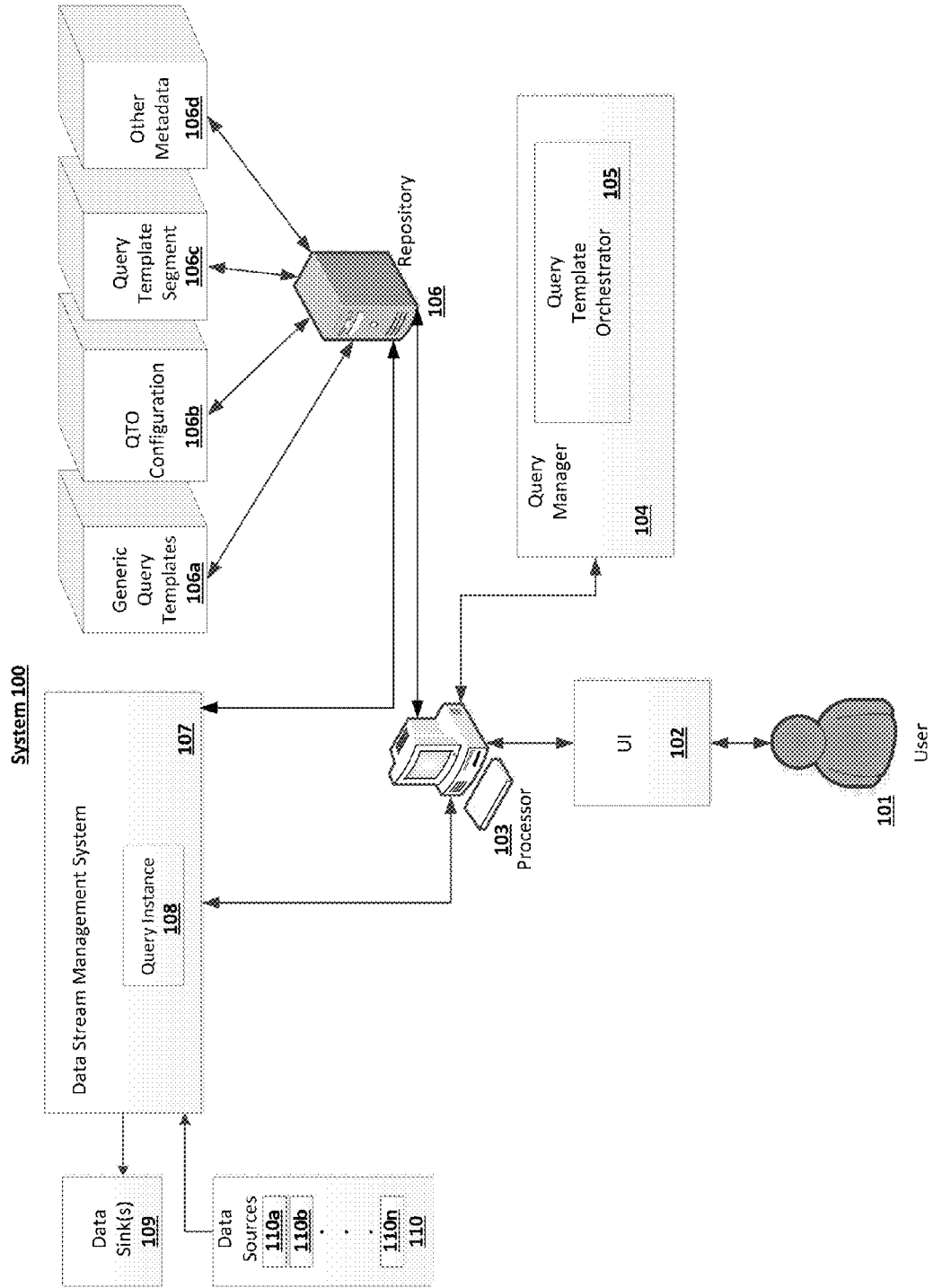
FIG. 1 illustrates an embodiment of a system utilizing generic query templates in data stream management systems.

FIG. 1 illustrates an embodiment of a system 100 utilizing generic query templates in data stream management systems. In an embodiment, the system 100 consists of a user 101, a user interface ("UI") 102, a processor 103, a query manager 104, query template orchestrator 105, a repository 106 which includes generic query templates 106a, query template orchestration ("QTO") configurations 106b, query template segments 106c and other metadata 106d, a data management stream system ("DSMS") 107, a query instance 108, data sinks 109 and data sources 110 which includes data sources 110a, 110b to an arbitrary number of inputs 110n. In an embodiment, the data sinks 109 of query instance 108 can correspond to the data sources 110 of another query instance 108.

In the example of FIG. 1, a query manager 104 (including query template orchestrator 105) operates in conjunction with data sources 110 and DSMS 107 to provide timely and accurate information to data sinks 109. More specifically, in an embodiment, the query manager 104 (including query template orchestrator 105) is configured to utilize generic query templates 106a, illustrated as being stored in repository 106, to create query templates that can be instantiated to deployable queries (illustrated by an example query instance 108) within the DSMS 107.

Figure 2:
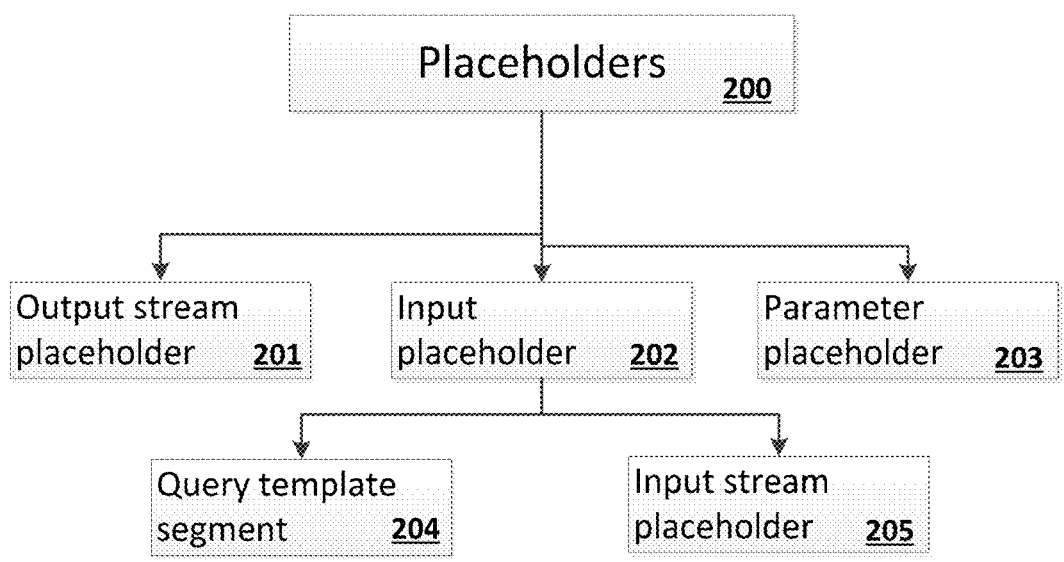
FIG. 2 illustrates an embodiment of the query template placeholder types.

As described in more detail below, and as illustrated in the example of FIG. 2, the generic query templates 106a include placeholders for alterable fields. In this way, query instances such as the query instance 108 can be created and/or updated in a timely, efficient, and accurate manner, without requiring creation of the query instance 108 from scratch and without requiring a manual process of copying and updating an existing query instance to obtain the query instance 108.

In the example of FIG. 1, the DSMS 107 represents a modified, conventional, or substantially conventional DSMS. For example, the DSMS 106 is implemented in a distributed manner, e.g., using various nodes communicating by network, or can be implemented in a more centralized fashion. The DSMS 106 also can represent or otherwise be referred to using other available variations/names, such as, e.g., business event processing system ("BEPS"), stream processing engine ("SPE"), or complex event processing ("CEP"). In any case, the DSMS 106 can be understood to represent any distributed or centralized system which receives or otherwise interacts with the stream data of the one or more stream data sources 110, where such stream data can be generally understood to represent a time series of data representing corresponding temporal events, and/or output streams resulting from operations performed using earlier such input streams.

In FIG. 1, as referenced above, the generic query templates 106a are illustrated as being stored within the repository 106. As described in detail herein, the generic query templates 106a can generally represent abstract, predefined query strings which have one or more placeholders for corresponding alterable fields. In this way, by replacing the placeholders in a desired manner, a given generic query template 106a can be instantiated to obtain the corresponding query instance 108 that is deployable within the DSMS 107, as shown.

In an embodiment, generic query template placeholders and specific query template placeholders are distinguished from the rest of the generic query template string and the specific query template string, respectively, in that the string representing the placeholders is encompassed by either hashtags, i.e., # . . . # (indicating that the string will be substituted with other string) or brackets surrounding the hashtags, i.e., <# . . . #> (indicating that the string can be substituted or removed). However, in another embodiment, the alterable fields can be designated by another suitable indicator serving the function of a placeholder. Therefore, when either the generic query template string or the specific query template string is being parsed, the query manager is able to determine which fields to alter. In an embodiment, the generic query template string has fields designating mandatory placeholders (i.e., # . . . #) and optional placeholders (i.e., <# . . . #>). In an embodiment, the specific query template string has fields designating mandatory placeholders. In another embodiment, the specific query template string can also have fields designating optional placeholders.

FIG. 2 illustrates an embodiment of the query template placeholder types. Query templates include placeholders 200. Placeholders 200 include an output stream placeholder 201, an input placeholder hierarchy 202 (which can be further replaced by query template segments 204 or an input stream placeholder 205) and a parameter placeholder 203. Input stream placeholders 205 and output stream placeholders 201 are substituted with input and output stream names, respectively. The parameter placeholder 203 is replaced with a parameter value, an expression (e.g., expressions including "<", ">", or "=") or arbitrary logic. A query template segment 204 is a predefined complex query code that could be inserted in a query template for handling multiple input streams. The query template segments 204 are reusable, i.e., they can be reused in different query templates. Further, query template segments 204 can also include various placeholders. In an embodiment, a query template segment 204 can have input stream placeholders, an output stream placeholder and parameter placeholders. In an embodiment, query template segment 204 can also include input placeholders. In other words, an input placeholder 202 can be replaced by a query template segment 204 including other input placeholders, which can be replaced again later. With input placeholders 202, now any part of the query can be substituted, thus providing additional flexibility to the query template. An input placeholder 202 can be mandatory or optional. In an embodiment, a mandatory placeholder always requires substitution while an optional placeholder may or may not be replaced (e.g., with either a query template segment 204 or an input stream placeholder 205). Thus, with input placeholder 202, a query template with a fixed number of input streams can now be modified to create a generic query template that could handle a variable number of input streams. Further, the placeholder types described above can be used for any query language (e.g., LINQ, CCL).

Figure 3:
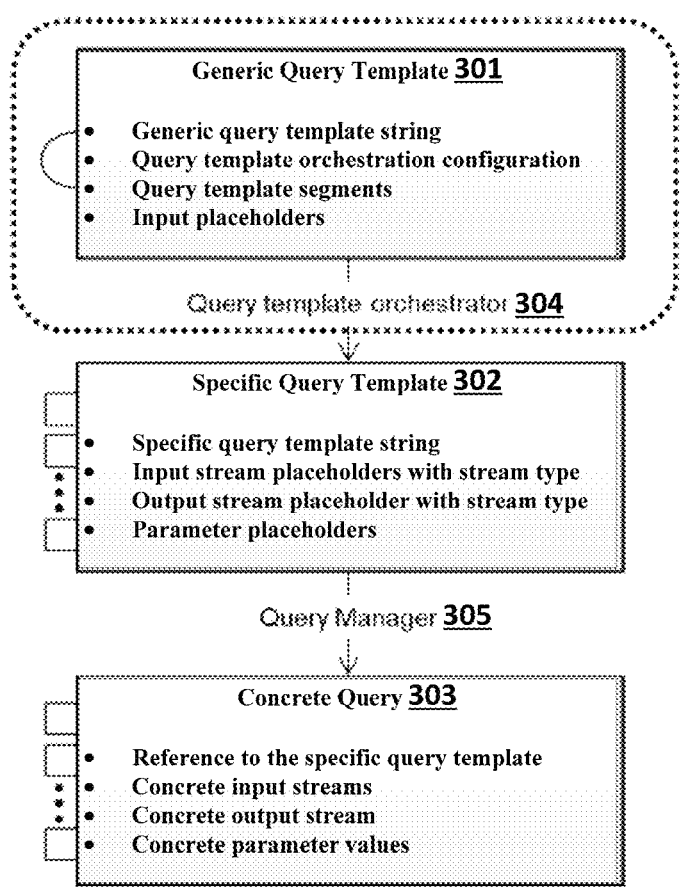
FIG. 3 illustrates a process of creating a deployable "concrete" query from a generic query template.

FIG. 3 illustrates a process of creating a deployable "concrete" query from a generic query template. The generic query template 301, includes the following elements: a generic query template string, a QTO configuration, query template segments and input placeholders. A generic query template string is a string literal that can include different placeholders. For example, depending on the QTO configuration, the generic query template string includes input placeholders that correspond to query template segments or input stream placeholders.

The generic query template string in the generic query template 301 is different from the specific query template string in the specific query template 302. In the specific query template string, there are only input stream placeholders, an output stream placeholder and parameter placeholders. These placeholders can only be replaced with concrete stream names or parameter values to create a concrete query 303. On the other hand, the generic query template string also includes input placeholders, which, as mentioned previously, can be replaced with either query template segments or with input stream placeholders.

In an embodiment, a query template orchestrator 304 is used to create a specific query template string, with a fixed number of input streams, from a generic query template string. The query template orchestrator 304 automates the process of creating a specific query template 302 from a generic query template 301 during runtime. The QTO configuration includes a set of instructions in order to generate a specific query template 302 with a fixed number of input streams. In an embodiment, the query template orchestrator 304 performs the steps that are specified in the QTO configuration for all the input streams to a query template. In other words, the query template orchestrator 304 takes the QTO configuration as the recipe and the generic query template 301 and query template segments as ingredients to form the specific query template 302. The query template orchestrator 304 is language-agnostic. In an embodiment, the query template orchestrator 304 does not have any knowledge of a streaming engine (i.e., DSMS 107); it only performs the actions prescribed by the QTO configuration.

The query template orchestrator 304 includes two phases that are required to create a specific query template 302 from a generic query template 301. In the first phase, the ingredient that is required to be included in the generic query template 301 is created or retrieved. The action to be performed is described through the orchestration type. One such orchestration type is 'get query template segment', which informs the query template orchestrator 304 to retrieve the query template segment specified in the particular step. Another orchestration type is 'insert input stream index', which indicates to the query template orchestrator 304 that it has to replace an input placeholder with the index of the current input stream for which the query template parsing is taking place. Another orchestration type is 'Create input stream placeholder', which orders the query template orchestrator 304 to create an input stream placeholder of the current input stream. The ingredient that is retrieved, or prepared, by the orchestration type is then assigned to an intermediate string. In an embodiment, if required for other query languages or other use cases, the set of orchestration types can be extended. In the second phase, an orchestration operator is applied to the input placeholder that is specified in the QTO configuration to substitute the placeholder with the intermediate string created by the orchestration type. To perform the orchestration, orchestration operators are defined. Available actions include: 'substitute' (replaces a placeholder with a query template segment), 'substitute if' (replaces a placeholder with a query template segment only when a provided condition is true), and 'append' (appends the intermediate string, usually a query template segment, to the generic query template 301, without the need of replacing any placeholder). In an embodiment, the set of orchestration operators is independent of the query languages and can be extended if further operations are needed.

After the query template orchestrator 304 executes the steps mentioned in the QTO configuration for all the input streams, it removes any optional placeholders that can still exist in the generic query template 301, which results in a specific query template 302.

The specific query template 302 includes a specific query template string, input stream placeholders with stream type, an output stream placeholder with stream type, and parameter placeholders. Like the generic query template string, the specific query template string is query-language specific. The specific query template string is a string literal and can be parsed and processed for a particular query language. The stream type of the input and output stream placeholders refers to the event type of the input and output streams.

The specific query template 302 is then supplied to the query manager 305, which replaces the placeholders with concrete stream names and parameter values, to create a deployable query, as seen in concrete query 303.

Figure 4:
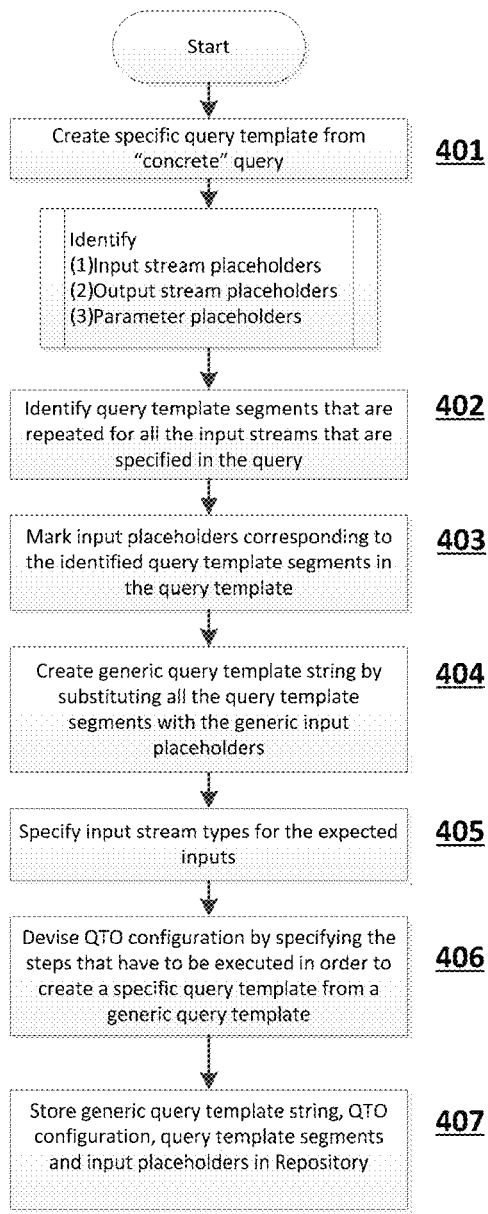
FIG. 4 illustrates a method of creating a generic query template from a "concrete query."

FIG. 4 illustrates a method of creating a generic query template from a "concrete" query. First, in step 401, a "concrete" query is deconstructed to create a specific query template. This involves identifying input stream placeholders, output stream placeholder and parameter placeholders in the "concrete" query. Then, in step 402, query template segments are identified. This involves determining the segments of the code which are repeated for all of the input streams specified in the query. Then, in step 403, the input placeholders corresponding to the identified query template segments are marked in the query template. Then, in step 404, a generic query template string is created by substituting all the query template segments with the generic input placeholders. Then, in step 405, the input stream types for the expected inputs are specified. Then, in step 406, a QTO configuration is generated specifying the steps that have to be executed in order to create a specific query template from a generic query template. Lastly, in step 407, the generic query template string, QTO configuration, the query template segments, and the input placeholders are stored in a database (i.e., the repository). In an embodiment, the process of creating a generic query template from a "concrete" query is performed based on user input on a computer processor. In another embodiment, the process of creating a generic query template form a "concrete" query is performed automatically by the computer processor.

Figure 5:
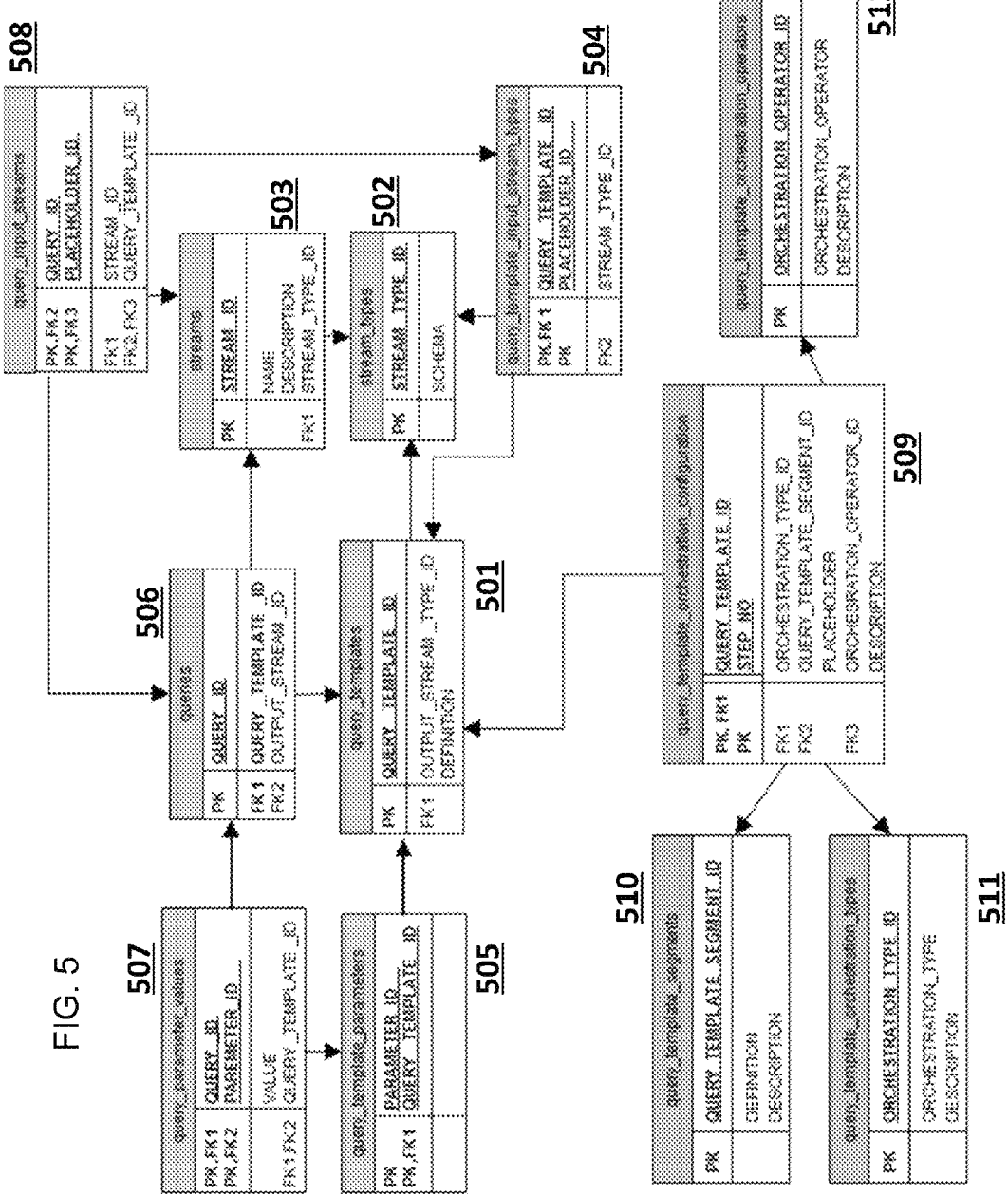
FIG. 5 illustrates an embodiment of the possible data structures (and their associated relationships) stored in the repository.

FIG. 5 illustrates an embodiment of the possible data structures (and their associated relationships) stored in the Repository. In an embodiment, the data structures are stored in a table-based format. However, many other additional or alternative techniques can be utilized to store and access relevant information in a desired manner. For example, the data stored using tables in FIG. 5 can alternatively be stored in the context of corresponding XML files.

In an embodiment, the tables in FIG. 5 are configured to be related to each other through the use of a key-based relationship. In a key-based relationship, an entity can serve as a primary key, which uniquely identifies each element in the instant table, and/or a foreign key (which also happens to be a primary key of another table), which uniquely identifies a row of a separate table. In other words, the foreign key is used as a link between two related tables. In FIG. 5, a primary key is denoted by PK and a foreign key is denoted by FK (or FK1, FK2, etc.).

Table 501 in FIG. 5 includes all of the query templates constructed for the data stream management system. A query template is identified by the identifier QUERY_TEM-PLATE_ID. Table 501 also includes an attribute, DEFINITION, which includes the query template string. Table 501 also includes a reference to OUTPUT_STREAM_TYPE_ID (i.e., a foreign key), which includes a list of the output stream types.

Table 502 includes the various event types that could be used to classify input and output streams. The event types are identified using the stream type identifier, STREAM_TYPE_ID. The event types can include a single value event, a binary event, a complex event, and any other event definition. Table 502 also includes an optional SCHEMA of the stream, which covers the attributes of the stream values and other descriptive information. In practice, the types of streams that can be included are virtually limitless, and can be characterized by user preference or other criteria in any given stream data context. For example, in the context of production facilities, the stream types can include characterizations of the types of measurements received from various sensors (e.g., vibration, temperature, or light sensors). Streams can also be typed according to characteristics of the data included therein. Streams can also be typed according to desired uses of the stream data, on geographical locations of production of the stream data, a desired business classification of the stream data, or on virtually any classification or description. Thus, a sufficiently high degree of choice is provided while at the same time facilitating fast, efficient and accurate identification and selection of actual input/output stream values by the user during operations of the system 100 of FIG. 1.

Table 503 includes all of the streams that are available in the system. The streams are identified using the stream identifier, STREAM_ID. Each stream consists of a name, a description, and a reference to STREAM_TYPE_ID. In an embodiment, a stream can be used as an input to a query or it can be a result of the query.

Table 504 includes the type of the stream for each input stream placeholder in the query template. In other words, it describes the relationship between the query templates and stream types of input streams. The elements in Table 504 can be identified by QUERY_TEMPLATE_ID and PLACEHOLDER_ID (unique placeholder label). The elements in Table 504 also includes a reference to STREAM_TYPE_ID.

Table 505 includes the parameter definitions for the parameter placeholders in a query template. The elements in Table 505 can be identified by the parameter type identifier, PARAMETER_ID, and QUERY_TEMPLATE_ID. A parameter can be understood to represent virtually any parameter which might characterize a query to be applied against the stream data. In the examples above, such parameters are related to characterizations of windows of data to be considered as well as specific characteristics of such windows. Of course, such parameters can also characterize any operator or other aspect of the query, including, e.g., mathematical operators (e.g., expressions including "<", ">", or "="), characterizations of a timing or extent of calculations to be performed, a quantity of most-recent stream data to be temporarily stored in a buffer for calculations performed thereon, conditions for beginning, modifying, or ending one or more calculations, arbitrary logic, and virtually any other parameter that can be used in conjunction with applications of queries against stream data.

Table 506 includes information about the deployed queries. The elements in Table 506 can be identified by the deployed query identifier, QUERY_ID. The elements in Table 506 includes references to QUERY_TEMPLATE_ID and OUTPUT_STREAM_ID (a list of output streams).

Table 507 includes the parameter values for the parameter placeholders in the query template. The elements in Table 507 can be identified by the QUERY_ID and PARAMETER_ID. The elements in Table 507 also includes a reference to QUERY_TEMPLATE_ID.

Table 508 includes the concrete input streams that are used for the query during query configuration. The elements in Table 508 are identified by QUERY_ID and PLACEHOLDER_ID. The elements in Table 508 also include a reference to STREAM_ID and QUERY_TEMPLATE_ID.

Table 509 includes the QTO configuration for each generic query template (i.e., a query template may or may not have a QTO configuration depending on whether it is a generic query template or a specific query template). The elements in Table 509 can be identified by QUERY_TEMPLATE_ID (i.e., the identifier of the query template for which the different steps mention in the query template orchestrator have to be performed) and STEP_NO (the flow of steps to create the query template). The elements in Table 509 also includes a reference to ORCHESTRATION_TYPE_ID (a list of the orchestration types which define the function to be performed). ORCHESTRATION_TYPE_ID forms an intermediate string which can replace the input placeholder in the query template that is specified in the current step. The elements in Table 509 also include a reference to QUERY_TEMPLATE_SEGMENT_ID (which indicates the identifier of the query template segment that has to be retrieved if the orchestration type is "Get query template segment"). The elements in Table 509 also includes a reference to PLACEHOLDER (which indicates which input placeholder in the query template needs to be substituted with the intermediate string formed using the orchestration type). The elements in Table 509 also includes a reference to ORCHESTRATION_OPERATOR_ID (which indicates the orchestration operator that is applied on the query template with respect to the intermediate string formed by orchestration type).

Table 510 includes all the necessary query template segments that may be required for the query templates in any query language. The elements in table 510 can be identified by QUERY_TEMPLATE_SEGMENT_ID (the identifier for a particular query template segment). Table 510 also includes the code for the query template segment, i.e., a language-specific string that could be used for a certain step by the query template orchestrator, which is found in DEFINITION.

Table 511 includes a list of the query template orchestration types used in Table 509. Table 511 also includes the descriptions of the various query template orchestrations types, which can be found in DESCRIPTION.

Lastly, table 512 includes a list of the orchestration operators used in Table 509. Table 512 also includes the descriptions of all the possible QTO operators listed in the table, which can be found in DESCRIPTION.

Figure 6A:
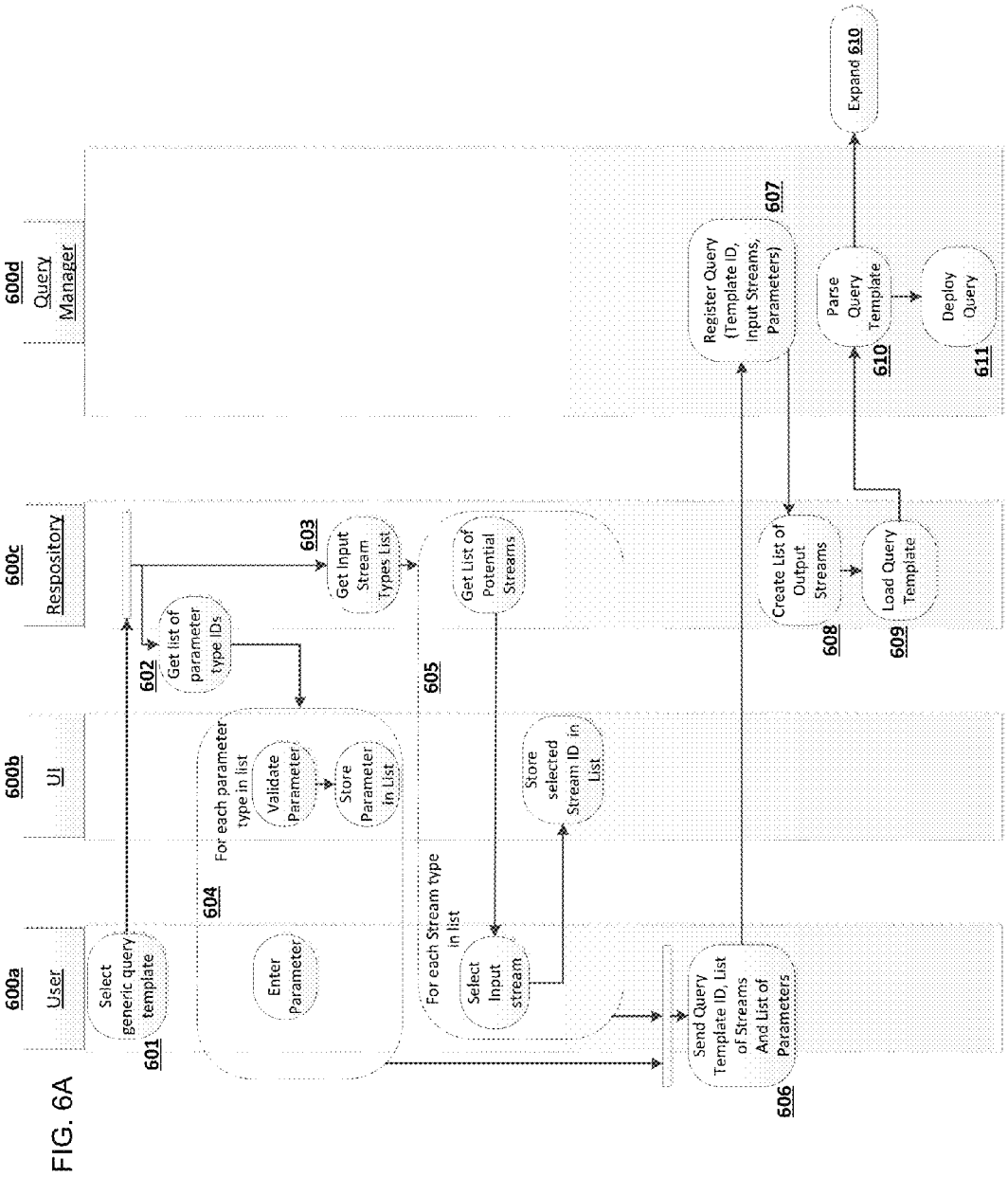
FIG. 6A-6B illustrate a process of generating a deployable "concrete" query from a query template.
Figure 6B:
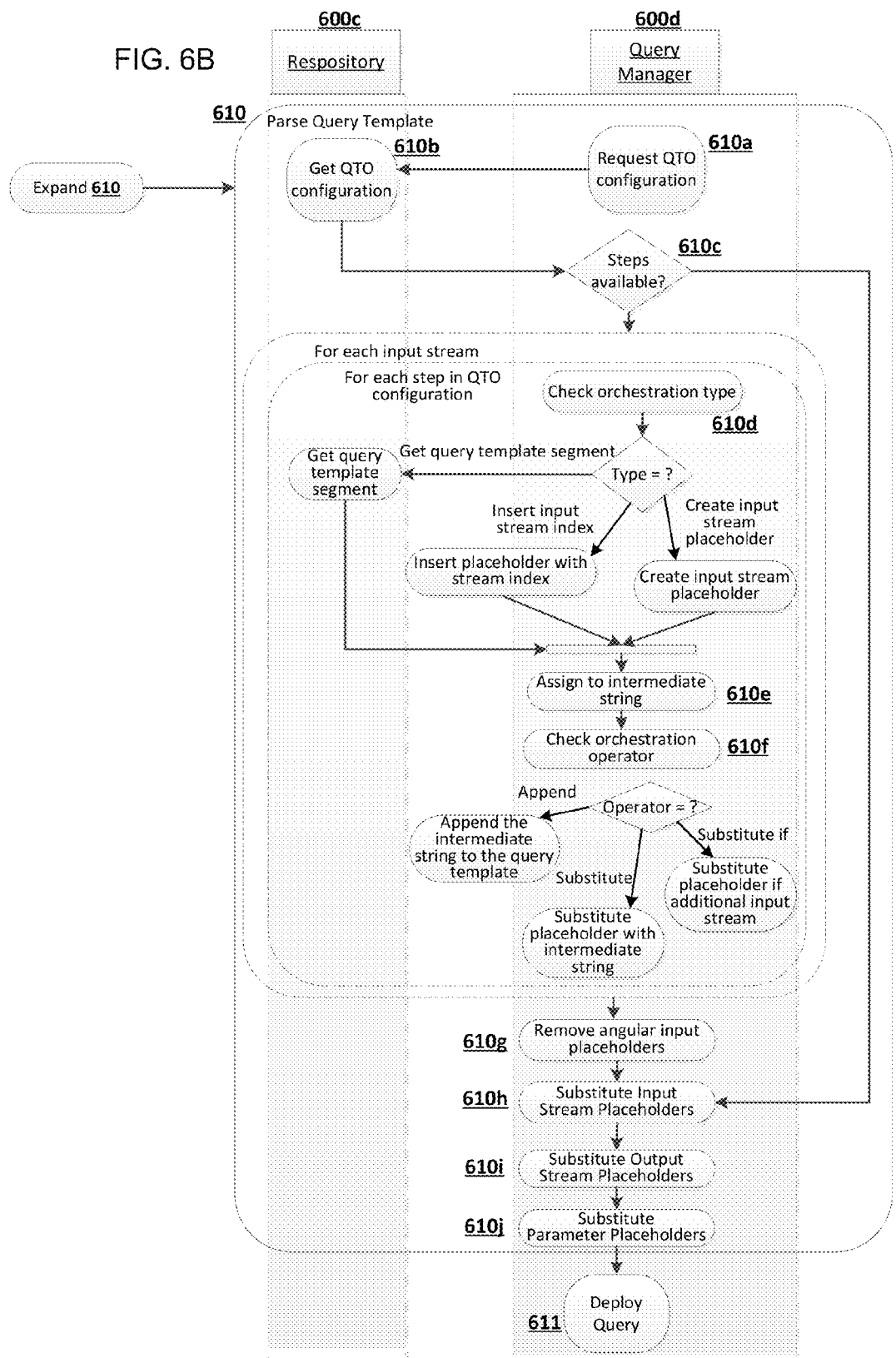

FIGS. 6A-6B illustrate a process of generating a deployable "concrete" query from a query template. In the example, as shown, a user 600a interacts with a UI 600b to thereby access or otherwise interact with data stored in a repository 600c. Further in FIG. 6, a query manager 600d (which also includes the query template orchestrator) may interact with the user 600a and the repository 600c to finalize creation and deployment of a query instance.

In the example of FIGS. 6A-6B, it is assumed that a plurality of query templates (specific and generic) have already been previously created and stored. Thus, in step 601, the user 600a may proceed to select a desired query template (specific or generic) from the stored query templates. In step 603, a list of the selected query template's parameter types is retrieved from the repository 600c. Then, in step 604, for each parameter type in the list, the user 600a specifies the desired parameters (parameter values) to be used with the query template. UI 600b validates and then stores each parameter value entered in the list of parameters. In step 603, a list of input stream types is retrieved from the repository 600c. Then, in step 605, for each stream type in the list, the user 600a specifies the desired input stream for each stream type to be used with the query template. UI 600b stores the specified streams in the list of input stream types. In an embodiment, the input streams have to be compatible with the input stream type stored for the query template. Then, in step 606, the user 600a sends the query template, with the list of parameters and inputs streams, to the query manager 600d. In step 607, query manager 600d registers the new query to be deployed (as well as the query template, list of input streams and list of parameters) in the repository 600c. After which, in step 608, a list of output streams for the query is created for storage in repository 600c. Then, in step 609, the query template string is retrieved from the repository and sent to query manager 600d to be parsed (as seen in step 610). After the parsing in step 610, a deployable, "concrete" query results, which is depicted in step 611. The parsing in step 610 will be described in more detail. The following sub-steps of 610 are executed automatically by the query template orchestrator during runtime. In an embodiment, the query template orchestrator is implemented in the query manager 600d.

In step 610a, as depicted in FIG. 6B, the query template orchestrator first determines if the configuration for the given query template is available in the list of QTO configurations 610a. As mentioned previously, the QTO configuration includes the set of instructions for the creation of a specific query template from a generic query template. In step 610b, the QTO configuration for the given query template is retrieved from the repository 600c. Then, in step 610c, query template operator determines if steps are available in the QTO configuration. If there are no steps available in the QTO configuration, the process moves to step 610h. No steps would be available in the QTO configuration if the query template provided to the query template orchestrator was already constructed with the specific number of input streams (i.e., a specific query template) and stored in the repository 600c. Otherwise, if steps are available, the query template orchestrator proceeds to step 610d. As depicted in FIG. 6B, steps 610d, 610e and 610f are repeated for each input stream specified by the user and for each step in the QTO configuration. In step 610d, query template orchestrator checks the orchestration type defined in the QTO configuration. If the orchestration type is Get query template segment, the query template orchestrator retrieves the query template segment, which is specified in the current processing step of the QTO configuration, from the repository 600c. If the orchestration type is Insert input stream index, the index of the input stream, for which the QTO configuration is being applied, is selected. If the orchestration type is Create input stream placeholder, the query template orchestrator creates the input stream placeholder for the current input stream for which the processing is taking place. For instance, for the first input stream, the string "#in:Stream1#" could be created. In step 610e, the result of the action performed based on the orchestration type is assigned to an intermediate string. In step 610f, the Query template orchestrator verifies the orchestration operator and applies that operator on the input placeholder that is mentioned in the processing step of the QTO configuration. If the orchestration operator is Substitute, the query template orchestrator replaces the input placeholder with the intermediate string. If the orchestration operator is Substitute if, the query template orchestrator first verifies whether there is any additional input stream for which the QTO configuration has to be applied. In case there is an additional input stream, the query template orchestrator substitutes the input placeholder with the intermediate string. If the orchestration operator is Append, the query template orchestrator appends the intermediate string to the query template. After all the steps are performed for all the input streams, in step 610g, the query template orchestrator removes any optional input placeholder remaining, thus resulting in a specific query template with a certain number of input streams. The query template now has only the input stream placeholders, output stream placeholder and parameter placeholders. Then, in steps 610h, 610i and 610j, the placeholders in the query template are substituted based on the user's configuration. Optionally, the query template with the specified number of inputs can be stored to the repository 600c, e.g., for later reference or reuse. Lastly, in step 611, the query is deployed.

FIG. 7A illustrates an exemplary generic query template in LINQ for an arbitrary number of input streams. For example, a generic query template can be language specific. As depicted in template 710, the generic query template has an input placeholder for the first input stream, designated by '#in:input stream#', and an input placeholder for every additional input stream, designated by '<#in:stream addition#>'. The angular placeholders indicate that the additional input stream is optional. Further, as depicted by the generic query template, input placeholders #in:input stream# and <#in:stream addition#> can be replaced with query template segments. FIG. 7B illustrates the possible query template segments for LINQ. For example, query template segment 721 can be used to replace #in:input stream#. If an additional input stream is used, then the input placeholder <#in:stream addition#> can be substituted by query template segment 722. This query template segment should include a '.Union' clause, which should be followed by #in:input stream#, so that it can be used by an input stream query template segment (i.e., query template segment 721). In addition, query template segment 722 also repeats <#in:stream addition#>. This input placeholder is the key element of the stream addition query template segment. It ensures that if there are any additional input streams, then the input placeholder for stream addition still exists in the query template to be replaced with stream addition query template segment. Query template segments can also include predefined logic as indicated by query template segment 723.

Figure 7C:
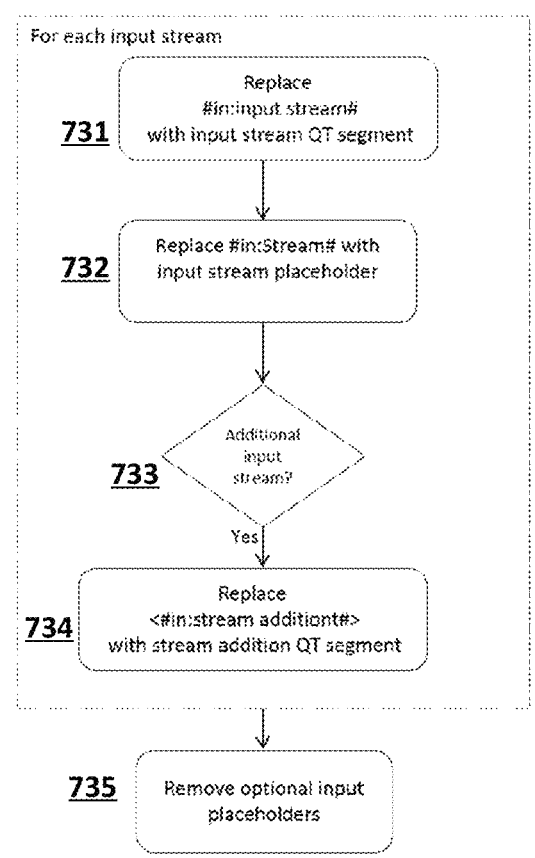
FIG. 7C illustrates a process of generating a specific query template from a generic query template in LINQ.

FIG. 7C illustrates a process of generating a specific query template from a generic query template in LINQ. The following steps are applied for each input stream. In step 731, placeholder #in:input stream# is replaced with input stream query template segment (i.e., query template segment 721), which includes '(#in:Stream#)'. In step 732, the query template segment is modified by inserting the index number of the input stream, i.e., '(#in:Stream1#).' This creates the input stream placeholder for the first input stream, which can later be substituted with a concrete input stream. In step 733, it is determined if an additional input stream is used. If an additional input stream is used, then, in step 734, the input placeholder <#in:stream addition#> is replaced by the stream addition query template segment (i.e., template segment 722). The steps are repeated for all of the input streams. Step 734 is not executed for the final input stream as there is no additional input stream for which the three steps have to be repeated. Thus, in step 735, the optional input placeholders in angular brackets are removed.

Figure 7D:
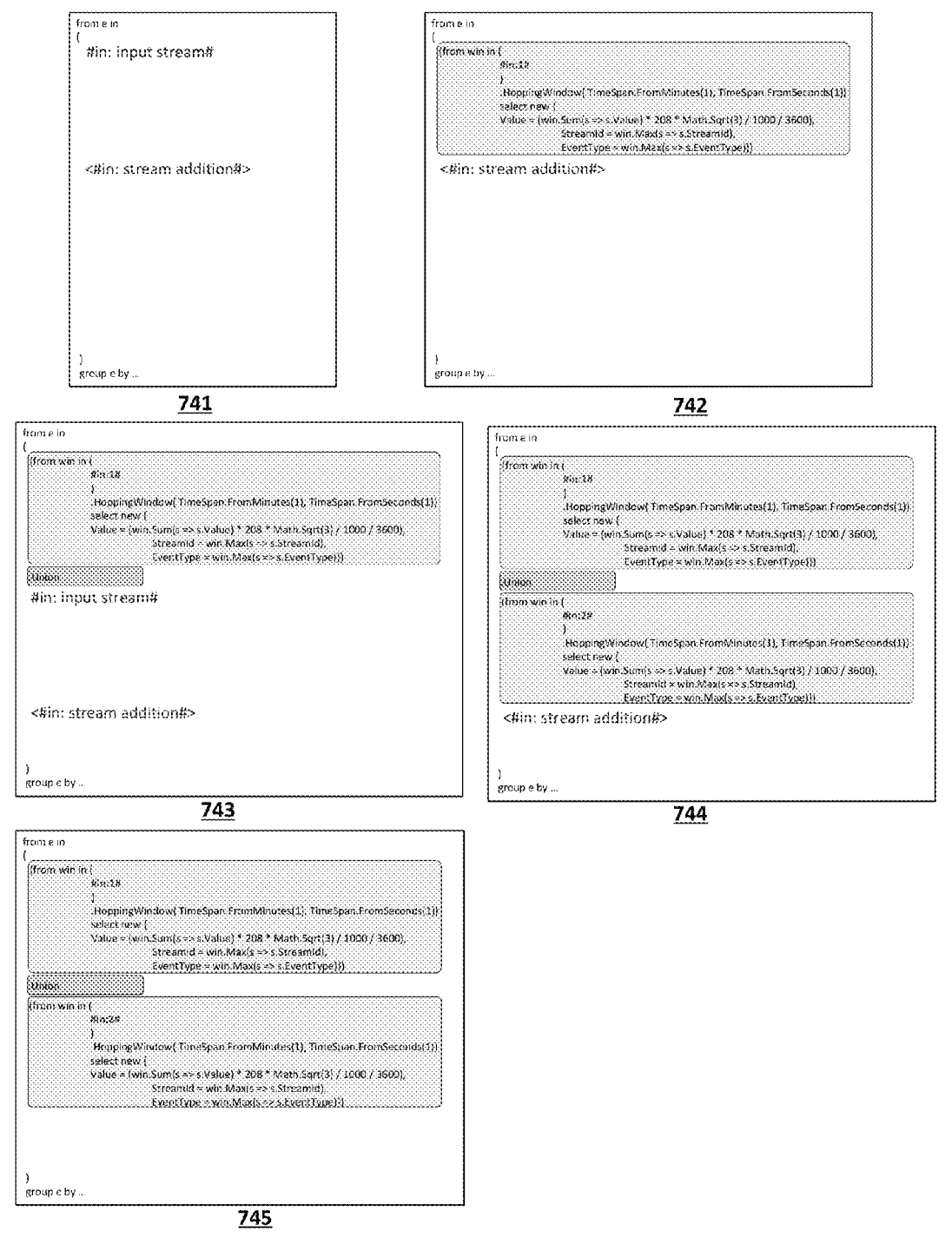

FIG. 7D illustrates an example of generating a specific query template with two input streams from a generic query template. In slide 741, a generic query template in LINQ, similar to query template 710, is depicted. In slide 742, a query template segment (e.g., query template segment 723) replaces placeholder #in:input stream#. Further, as depicted in slide 742, the query template segment is modified by inserting the index number of the input stream, i.e., #in:1#; thus creating the first input stream placeholder for the first input stream. In slide 743, because there is an additional input stream, input placeholder <#in:stream addition#> is replaced by the stream addition query template segment (i.e., template segment 722). In slide 744, the placeholder #in:input stream# of the stream addition query template segment (i.e., template segment 722) is replaced by query template segment (i.e., query template segment 723). Further, similar to slide 742, in slide 744, the query template segment is modified by inserting the index number of the input stream, i.e., #in:2#; thus creating the second input stream placeholder for the second input stream. In slide 745, since there are no more additional input streams, the optional input placeholder <#in:stream addition#> is removed.

FIG. 8A illustrates a generic query template in CCL for an arbitrary number of input streams. As depicted in template 810, the generic query template for CCL includes an input placeholder <#in:dict store#> for the dictionary structure that stores the intermediate value, an input placeholder <#in:dict aggregation#> for the dictionary aggregation, an input placeholder <#in:EventType#> for the event type, and input placeholder <#in:Stream addition#> for stream addition. The above placeholders are replaced by query template segments. There is also a placeholder for the first input stream, #in:Stream1#.

FIG. 8B illustrates possible query template segments for CCL. Query template segment 822 includes the dictionary structure that stores the intermediate value. In order to ensure that the input placeholder for the dictionary store can be used for other input streams, the input placeholder <#in:dict store#> is also included in query template segment 822. Moreover, because a "semicolon" is used for every additional input stream, the input placeholder <#in:semicolon#> is also embedded inside query template segment 822. The "semicolon" is also treated as a query template segment, as depicted by query template segment 821. The input placeholder for the dictionary structure, <#in:dict store#>, is replaced with query template segment 822. In an embodiment, if there is only one input stream, the input placeholders for "semicolon", <#in:semicolon#> and dictionary structure, <#in:dict store#>, are removed. Query template segment 824 is used for the summation of dictionary structures. If an additional input stream is used, the summation operator, "+", is introduced, followed by the dictionary structure for the next input stream. Therefore, query template segment 824 includes the input placeholders for dictionary aggregation, <#in:dict aggregation#>, and the summation operator, <#in:summation#>. The summation operator is also treated as a query template segment, as depicted in query template segment 823. Query template segment 827 is used for event type. For a single input stream, only the event type for the first input stream is required. The event type for every additional input stream is separated by a "comma." Therefore, the query template segment for event type, 827, includes input placeholders for an event type, a comma and a placeholder for itself. Therefore a "comma" is also treated as a query template segment, as depicted in query template segment 826. Query template segment 825 is used for stream addition. The input placeholder for stream addition, <#in:Stream addition#> is also part of query template segment 825, so it can be reused for additional input streams. The query template segments for CLL are not limited to the aforementioned query template segments and could include a number of different forms (e.g., a CCL version of query template segment 723).

Figure 8C:
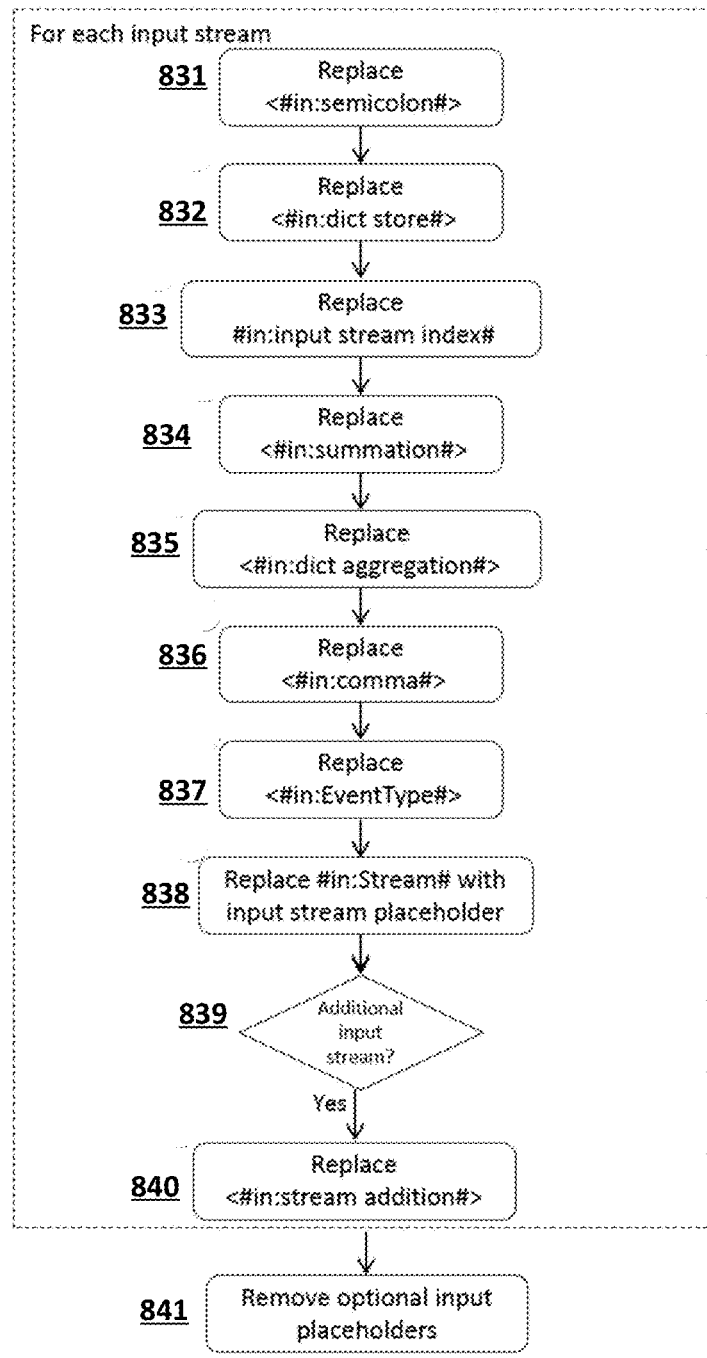
FIG. 8C illustrates a process of generating a specific query template from a generic query template in CCL.

FIG. 8C illustrates a process of generating a specific query template from a generic query template in CCL. With regard to the first input stream, a few steps of the process are not performed as the generic query template does not initially have the input placeholders mentioned in those steps. For example, step 831 is not executed for the first input stream as there is no input placeholder for the "semicolon" in the generic query template. In step 832, the input placeholder for the dictionary structure, <#in:dict store#>, is replaced with its corresponding query template segment (query template segment 822). With the substitution, the generic query template now includes the input placeholder for "semicolon." Then, in step 833, the input placeholder for input stream index, #in: input stream index#, is replaced to identify the dictionary key. Step 834 is skipped for the first input stream as there is no input placeholder for summation. In step 835, the dictionary aggregation input placeholder, <#in:dict aggregation#>, is replaced with the its corresponding query template segment, 824. The generic query template now includes the summation placeholder since query template segment 824 includes an input placeholder for summation. Step 836 is not performed since there is no input placeholder for "comma." In step 837, the input placeholder for event type, <#in:EventType#>, is substituted with its corresponding query template segment, 827. The generic query template now includes the "comma" input placeholder since the query template segment 827 has an input placeholder for "comma." In step 838, the index number for the input stream is inserted, which can be used later to substitute in concrete input stream names. In step 839, it is determined if there is an additional input stream. If there is an additional input stream, for which the query template has to be built, in step 840, the input placeholder for stream addition, <#in: Stream addition#>, is substituted with its corresponding query template segment, 825. Now the generic query template has all the input placeholders and the steps that were skipped for the first input stream will now be performed for the additional input streams. In general, the steps are repeated for all of the input streams. If there is no input stream remaining to be processed, the loop ends. After exiting from the loop, the input placeholders in angular brackets are removed to get the final query template. The query template now only has input stream placeholders, output stream placeholder and parameter placeholders, which can be replaced with concrete streams or parameter values.

FIG. 8D illustrates an example of a CCL generic query template after processing the first input stream. The code in FIG. 8D shows the state of the generic query template once the steps are executed for the first input stream, thus there are still additional input streams for which the steps in FIG. 8C have to be repeated.

FIG. 9A illustrates an example of a specific query template. In the example of FIG. 9A, it is assumed that queries are required for analyzing the stream data related to one or more production facilities. For example, the system 100 of FIG. 1 can be deployed in the control and monitoring of production assets of a manufacturing plant, in order, for example, to save costs, predict down times, prevent the production of scrap, and dynamically adjust production processes. To this end, production machinery can be equipped with numerous sensors, such as vibration, power, or temperature sensors, which are designed to provide information regarding a health and production state of an associated machine.

Thus, in the example of FIG. 9A, the specific query template 900a can be related to calculations of energy consumption by such a machine. Therefore, a line 902a specifies creation of an output window in which a placeholder 904a is designated by hashtags, placeholder type (out:) and names a type of desired type of output stream as "EnergyConsumption_Stream."

Somewhat similarly, a line 906a specifies related types of parameters to be used in obtaining a desired output stream. Specifically, and as shown, a placeholder 908a designates a type of parameter specifying a size of a window of data to be captured, while a placeholder 910a specifies a corresponding unit of the window size. In this context, as referenced above, the term window generally refers to discrete, defined sections or portions of received data streams obtained from data sources 110, over which, or against which, queries can be executed. Such a window thus specifies, e.g., by unit of quantity (i.e., count) and/or by unit of time, a finite set of recent events, items, or other discrete elements (also sometimes referred to as "tuples" or "data tuples") from the otherwise-unbounded data stream.

A line 912a specifies operations to be performed on input streams in order to obtain the desired output stream. Specifically, in the example, the line 912a specifies summation of the attribute Power of the identified input stream (i.e., specified input streams having corresponding attributes) and stored as EnC (energy consumption). In the example, such input power streams to be evaluated in the line 912a are specified in a line 914a, which includes a placeholder 916a, offset by corresponding hashtags and placeholder types (in:), in identifying the relevant type of input stream.

Finally in the example specific query template 900a, a line 918a specifies a grouping operation that is executed with respect to individual tuple identifiers (attribute ID) in the input stream. In this regard, it can be appreciated that, although the simplified example of FIG. 9A only explicitly identifies a single placeholder for an associated input stream, it also can occur (as explained in more detail below) that a plurality of such input streams can be identified for use in the specific query template 900a.

Nonetheless, continuing with the simplified example of FIG. 9A, FIG. 9B illustrates an example 900b of an instantiation of the specific query template 900a of FIG. 9A. That is, FIG. 9B provides an example of the query instance 108 that can be obtained from a corresponding specific query template.

Consequently, the query instance 900b includes various values which have been substituted for corresponding placeholders within the corresponding, designated alterable fields. For example, as shown, the query instance 900b includes a line 902b corresponding to the line 902a, in which the placeholder 904a has been replaced within a corresponding alterable field with a value 904b for a corresponding output stream which corresponds to an energy consumption of a particular machine which is identified as machine 1 in the example.

Similarly, a line 906b corresponds to the line 906a of FIG. 9A, in which the placeholders 908a, 910a have been replaced with corresponding alterable fields with values "1" 908b and "DAY" 910b. In other words, the line 906b specifies that the window size unit is equivalent to a 24 hour day, while the value 908*b* specifies that a desired value of a corresponding window is equal to 1, i.e., the resulting window is equivalent to one day's worth of data.

Similarly, a line 914*b* corresponds to the line 914*a* of FIG. 9A, and includes a value 916*b* substituted for the placeholder 916*a* within a corresponding alterable field. Specifically, as shown, the value 916*b* is included as identifying power measurements from machine 1 and is identified in the example as Power_Machine1. Finally in the example of FIG. 9B, it can be observed that lines 912*b*, 918*b* correspond to lines 912*a*, 918*a* of FIG. 9A. However, as observed, these lines do not include placeholders with alterable fields, and therefore do not include any substitutions of values. Rather, the lines 912*b*, 918*b* simply specify operations to be performed by the query instance 900*b* according to the specified input streams and parameter values.

Of course, it may be appreciated that FIGS. 9A, 9B provide specific, simplified examples, and that many additional or alternative embodiments can be implemented. For example, instead of aggregating energy consumption over a period of time for a specific physical machine, the specific query template 900*a* can be instantiated to obtain a query instance designed to provide aggregate energy consumption for a logical entity, e.g., of all machines on a particular floor, or associated with a particular group, or for an entire facility. Moreover, it can be appreciated that specific query templates can be formulated for the collection and/or analysis of data related to virtually any performance indicator or other metric that can be collected by the DSMS 107 by way of the data sources 110.

Further with respect to the simplified and specific examples of FIGS. 9A, 9B, it can be appreciated that the specific query template 900*a* includes the various placeholders by inserting a descriptive name (e.g., type) within corresponding hashtags, as described and illustrated above. In these examples, the placeholders can be, as shown, numbered sequentially by type. However, in other examples, such descriptive names need not be included, and, instead, specific query templates can include only a corresponding alterable field, designated by the hashtags of FIG. 9A or other suitable indicator serving the function of the placeholder. For example, the placeholder 904*a*, in such scenarios, would not require use of the indicator "out:EnergyConsumption_Stream", and/or the placeholders can be numbered in a sequence without regard to type.

Finally with respect to the examples of FIGS. 9A, 9B, the specific query template 900*a* and the query instance 900*b* are illustrated using CCL which is a query language of Sybase ESP. However, it can be appreciated that many different types of stream query languages exist and can be utilized. For example, additional or alternative languages can be used including the language LINQ utilized, e.g., in Microsoft StreamInsight, and/or SQL (standard query language). In general, the concepts described herein can be utilized in a manner that is generally independent of an associated query language that is used, since language-specific elements can simply be included within a desired specific query template to be created and utilized.

Implementations of the various techniques described herein can be implemented in digital electronic circuitry, or in computer hardware, firmware, software, or in combinations of them. Implementations can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions by operating on input data and generating output. Method steps also may be performed by, and an apparatus can be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer can include at least one processor for executing instructions and one or more memory devices for storing instructions and data. Generally, a computer also can include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, implementations can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components can be interconnected by any form or medium of digital data communication, e.g., a communication network. Examples of communication networks include a local area network (LAN) and a wide area network (WAN), e.g., the Internet.

Although the foregoing invention has been described in some detail for purposes of clarity of understanding, it will be apparent that certain changes and modifications can be practiced within the scope of the appended claims. The described embodiment features can be used with and without each other to provide additional embodiments of the present invention. The present invention can be practiced according to the claims without some or all of these specific details. For the purpose of clarity, technical material that is known in the technical fields related to the invention has not been described in detail so that the present invention is not unnecessarily obscured. It should be noted that there are many alternative ways of implementing both the process and apparatus of the present invention. Accordingly, the present embodiments are to be considered as illustrative and not restrictive, and the invention is not to be limited to the details given herein, but can be modified within the scope and equivalents of the appended claims.

What is claimed is:

1. A computer-implemented method for generating queries with a number of input streams from a generic query template, the method comprising:
    sending, with a processor, a selected generic query template and an at least one entered query input stream to a query manager, wherein the generic query template includes at least one predefined query string having placeholders at designated alterable fields of the generic query template, each placeholder of the generic query template having a mandatory designation or an optional designation;
    registering, with the query manager, the selected generic query template and the at least one entered query input stream;
    generating, with the query manager, at least one query output stream based on the registered generic query template and the at least one registered query input stream;
    loading, with the query manger, the registered generic query template with the at least one query output stream and the at least one registered query input stream;
    parsing, with the query manager, the loaded generic query template, comprising:
        retrieving, with the query manager, a query template orchestration configuration for the loaded generic query template from the database; and
        upon determining, with the query manager, that instructions are available in the query template orchestration configuration,
        executing, with the query manager, the instructions in the query template orchestration configuration, wherein each step of the instructions is executed for each of the at least one query input stream; and
    forming a deployable query for instantiation within a data stream management system from substituting, with the query manager, the placeholders with the at least one query output stream and the at least one registered query input stream.

2. The method of claim 1, wherein the placeholders include at least one of an input stream placeholder, an output stream placeholder, a parameter placeholder and an input placeholder, wherein the input stream placeholder is substituted with the at least one registered query input stream, the output stream placeholder is substituted with the at least one query output stream, the parameter placeholder is substituted with a mathematical comparative operator expression, and the input placeholder is substituted with a query template segment or the input stream placeholder.

3. The method of claim 2, wherein the query template segment is a predefined complex query code which is inserted into the generic query template, wherein the query template segment includes at least one of the input stream placeholder, the output stream placeholder, the parameter placeholder and the input placeholder.

4. The method of claim 3, wherein the instructions in the query template orchestration configuration are executed by a query template orchestrator, wherein the query template orchestration configuration includes instructions to perform actions on the placeholders in the generic query template, wherein the actions are (1) described by an orchestration type and (2) performed by an orchestration operator.

5. The method of claim 4, wherein the orchestration operator performs at least one of (1) retrieving the query template segment specified in the step of the instruction (2) replacing the input placeholder in the generic query template with an index of an instant query input stream and (3) creating another input stream placeholder in the generic query template for the instant query input stream.

6. The method of claim 4, wherein the orchestration operator performs at least one of (1) replacing the placeholder with the query template segment (2) replacing the placeholder with a query template segment only if additional input streams are to be processed and (3) appending an intermediate string to the generic query template.

7. The method of claim 1, wherein substituting the placeholders occurs only for placeholders having the mandatory designation.

8. A non-transitory computer readable medium having program instructions for generating queries with a number of input streams from a generic query template, wherein execution of the program instructions by one or more processor of a computer system causes one or more processor to carry out the steps of:
    sending a selected generic query template and an at least one entered query input stream to a query manager, wherein the generic query template includes at least one predefined query string having placeholders at designated alterable fields of the generic query template, each placeholder of the generic query template having a mandatory designation or an optional designation;
    registering, with the query manager, the selected generic query template and the at least one entered query input stream;
    generating, with the query manager, at least one query output stream based on the registered generic query template and the at least one registered query input stream;
    loading, with the query manager, the registered generic query template with the at least one query output stream and the at least one registered query input stream;
    parsing, with the query manager, the loaded generic query template, comprising:
        retrieving, with the query manager, a query template orchestration configuration for the loaded generic query template from the database; and
        upon determining, with the query manager, that instructions are available in the query template orchestration configuration,
        executing, with the query manager, the instructions in the query template orchestration configuration, wherein each step of the instructions is executed for each of the at least one query input stream; and
    forming a deployable query for instantiation within a data stream management system from substituting, with the query manager, the placeholders with the at least one query output stream and the at least one registered query input stream.

9. The non-transitory computer readable medium of claim 8, wherein the placeholders include at least one of an input stream placeholder, an output stream placeholder, a parameter placeholder and an input placeholder, where in the input stream placeholder is substituted with the at least one registered query input stream, the output stream placeholder is substituted with the at least one query output stream, the parameter placeholder is substituted with a mathematical comparative operator expression, and the input placeholder is substituted with a query template segment or the input stream placeholder.

10. The non-transitory computer readable medium of claim 9, wherein the query template segment is a predefined complex query code which is inserted into the generic query template, wherein the query template segment includes at least one of the input stream placeholder, the output stream placeholder, the parameter placeholder and the input placeholder.

11. The non-transitory computer readable medium of claim 10, wherein the instructions in the query template orchestration configuration are executed by a query template orchestrator, wherein the query template orchestration configuration includes instructions to perform actions on the placeholders in the generic query template, wherein the actions are (1) described by an orchestration type and (2) performed by an orchestration operator.

12. The non-transitory computer readable medium of claim 11, wherein the orchestration operator performs at least one of (1) retrieving the query template segment specified in the step of the instruction (2) replacing the input placeholder in the generic query template with an index of an instant query input stream and (3) creating another input stream placeholder in the generic query template for the instant query input stream.

13. The non-transitory computer readable medium of claim 11, wherein the orchestration operator performs at least one of (1) replacing the placeholder with the query template segment (2) replacing the placeholder with a query template segment only if additional input streams are to be processed and (3) appending an intermediate string to the generic query template.

14. A system directed to generating queries with an arbitrary number of input streams from a generic query template, comprising:
 a database;
 a data stream management system;
 a query manager;
 a processor, wherein the processor performs the steps of:
  sending a selected generic query template and at least one entered query input stream to the query manger, wherein the generic query template includes at least one predefined query string having placeholders at designated alterable field of the generic query, each placeholder of the generic query template having a mandatory designation or an optional designation;
  registering, with the query manager, the selected generic query template and the at least one entered query input stream;
  generating, with the query manager, at least one query output stream based on the registered generic query template and the at least one registered query input stream;
  loading, with the query manager, the registered generic query template with the at least one query output stream and the at least one registered query input stream;
  parsing, with the query manager, the loaded generic query template, comprising:
   retrieving, with the query manager, a query template orchestration configuration of the loaded generic query template from the database; and
   upon determining, with the query manager, that instructions are available in the query template orchestration configuration,
    executing, with the query manager, the instructions in the query template orchestration configuration, wherein each step of the instructions is executed for each of the at least one query input stream;
  forming a deployable query for instantiation within the data stream management system from substituting, within the query manager, the placeholders with the at least one query output stream and the at least one registered query input stream; and
  deploying the deployable query within the data stream management system for application against stream data.

15. The system of claim 14, wherein the placeholders include at least one of an input stream placeholder, an output stream placeholder, a parameter placeholder and an input placeholder, wherein the input stream placeholder is substituted with the at least one registered query input stream, the output stream placeholder is substituted with the at least one query output stream, the parameter placeholder is substituted with a mathematical comparative operator expression, and the input placeholder is substituted with a query template segment or the input stream placeholder.

16. The system of claim 15, wherein the query template segment is a predefined complex query code which is configured to be inserted into the generic query template, wherein the query template segment includes at least one of the input stream placeholder, the output stream placeholder, the parameter placeholder and the input placeholder.

17. The system of claim 16, where in the instructions in the query template orchestration configuration are executed by a query template orchestrator, wherein the query template orchestration configuration includes instructions to perform actions on the placeholders in the generic query template, wherein the actions are (1) described by an orchestration type and (2) performed by an orchestration operator.

18. The system of claim 17, wherein the orchestration operator performs one of (1) retrieving the query template segment specified in the step of the instruction (2) replacing the input placeholder in the generic query template with an index of an instant query input stream and (3) creating another input stream placeholder in the generic query template for the instant query input stream.

19. The system of claim 17, wherein the orchestration operator performs one of (1) replacing the placeholder with the query template segment (2) replacing the placeholder with a query template segment only if additional input streams are to be processed and (3) appending an intermediate string to the generic query template.

20. The system of claim 14, wherein substituting the placeholders occurs only for placeholders having the mandatory designation.

* * * * *